United States Patent [19]

Nakagome et al.

[11] Patent Number: 4,464,903

[45] Date of Patent: Aug. 14, 1984

[54] MAGNETIC REFRIGERATOR

[75] Inventors: Hideki Nakagome, Yokohama; Takasu Hashimoto, Kawasaki, both of Japan

[73] Assignee: Tokyo Shibaura Denki Kabushiki Kaisha, Kawasaki, Japan

[21] Appl. No.: 455,655

[22] Filed: Jan. 5, 1983

[30] Foreign Application Priority Data

Jan. 22, 1982 [JP] Japan .................................. 57-7526

[51] Int. Cl.³ ............................................. F25B 21/02
[52] U.S. Cl. ........................................................ 62/3
[58] Field of Search .............................................. 62/3

[56] References Cited

U.S. PATENT DOCUMENTS

| | | | |
|---|---|---|---|
| 2,780,069 | 2/1957 | Olcott | 62/3 |
| 2,913,881 | 11/1959 | Garwin | 62/3 |
| 3,004,394 | 10/1961 | Fulton, Jr. et al. | 62/3 |
| 3,125,861 | 3/1964 | Jaep | 62/3 |
| 3,393,526 | 7/1968 | Pearl | 62/3 |
| 3,421,330 | 1/1969 | Otter, Jr. et al. | 62/3 |
| 3,543,841 | 12/1970 | Eastman | 165/80 |
| 3,818,980 | 6/1974 | Moore | 165/32 |
| 3,841,107 | 10/1974 | Clark | 62/3 |
| 3,884,296 | 5/1975 | Basiulis | 165/96 |
| 4,033,734 | 7/1977 | Steyert, Jr. et al. | 62/3 |
| 4,069,028 | 1/1978 | Brown | 62/3 |
| 4,107,935 | 8/1978 | Steyert, Jr. | 62/3 |

FOREIGN PATENT DOCUMENTS

| | | |
|---|---|---|
| 1950448 | 4/1971 | Fed. Rep. of Germany . |
| 2028651 | 4/1971 | Fed. Rep. of Germany . |
| 691648 | 10/1930 | France . |

OTHER PUBLICATIONS

CRYOGENICS, vol. 21, No. 10, Oct. 1981, pages 579-584
JOURNAL OF APPLIED PHYSICS, vol. 42, No. 4, 15th Mar. 1971 pages 1522-1527

*Primary Examiner*—Lloyd L. King
*Attorney, Agent, or Firm*—Oblon, Fisher, Spivak, McClelland & Maier

[57] ABSTRACT

A magnetic refrigerator comprises a working material radiating heat when a magnetic field is applied thereto and absorbing heat when the magnetic field is removed therefrom, and magnetic coil which is movable for selectively applying or removing the magnetic field to or from the working material. Directional heat pipes are disposed between the working material and an object of cooling, whereby heat from the object of cooling is transmitted to the working material when the working material absorbs the heat, and whereby heat from the working material is prevented from being transmitted to the object of cooling when the working material radiates the heat.

9 Claims, 7 Drawing Figures

MAGNETIC REFRIGERATOR

BACKGROUND OF THE INVENTION

This invention relates to a magnetic refrigerator using a working material which radiates heat when a magnetic field is applied thereto and absorbs heat when the magnetic field is removed.

Magnetic refrigerators are based on the well-known phenomenon that materials, such as gadolinium-gallium-garnet (GGG; $Gd_3Ga_5O_{12}$) or other rare-earth element compounds or alloys including an alloy of erbium and nickel, radiate heat when a magnetic field is applied to them, and absorb heat when the magnetic field is removed.

These refrigerators have been developed in order to cool helium gas to a very low temperature. Liquid helium at a very low temperature is necessary for cooling superconductive magnets used in nuclear fusion research and for linear motor cars and computers using Josephson elements. Thus, the damand for high-performance refrigerators is increasing in these fields.

A prior art magnetic refrigerator is shown in FIG. 1. In this refrigerator, two superconductive coils 3 and 4 are fixed at a space in a container 2 containing liquid helium 1 at a temperature of 4.2° K. A cylinder 12 is coaxially fixed between the coils 3 and 4. A piston 5 is slidably passed through the cylinder 12. Both extended portions of the piston 5 can individually penetrate the superconductive coils 3 and 4. The piston 5 includes lower, intermediate, and upper portions 5a, 5b and 5c spaced axially. The lower and intermediate portions 5a and 5b are coupled by a working material 7 between them, while the intermediate and upper portions 5b and 5c are connected by another working material 6 between them. The working materials 6 and 7 may be formed of, e.g., gadolinium-gallium-garnet. A support tube 13 is coaxially attached to the outer peripheral surface of the cylinder 12, and a cylindrical adiabatic member 11 is coaxially fixed to the outer peripheral surface of the support tube 13. An annular opening is bored through the central portions of the peripheral walls of the cylinder 12 and the support tube 13. Thus defined is a helium bath 10 which is enclosed with the adiabatic member 11 and penetrated by the piston 5. A material to be cooled (helium in the case) is sealed in the helium bath 10. This helium is at a temperature of 4.2° K., and is intended to be cooled to a lower temperature of 1.8° K.

The operation of the prior art magnetic refrigerator of the aforementioned construction will now be described.

First, the superconductive coils 3 and 4 are energized to form magnetic fields therein. Then, the piston 5 is reciprocated between an upper position as shown in FIG. 1 and a lower position. When the piston 5 is in the upper position, the first working material 6 is located in the magnetic field produced by the one superconductive coil 3, and radiates heat therefrom. When the piston 5 is then moved downward, the working material 6 leaves the magnetic field, and absorbs heat therein and brought into the helium bath 10. As a result, the helium in the helium bath 10 is cooled by the working material 6. When the piston 5 is in the lower position, the second working material 7 is located in the magnetic field produced by the other superconductive coil 4, and radiates heat therefrom. Then, the piston 5 is moved upward, the working material 7 is brought into the helium bath 10, and the helium is cooled.

In the refrigerator thus constructed, the piston 5 slides in the cylinder 12, so that heat is produced by friction between the piston 5 and the cylinder 12. The helium in the helium bath 10 is heated by this frictional heat to lower the refrigerating efficiency.

SUMMARY OF THE INVENTION

The object of this invention is to provide a magnetic refrigerator capable of preventing production of superfluous heat in order to increase refrigerating efficiency.

According to this invention, there is provided a magnetic refrigerator which comprises one or more directional heat pipes disposed between a working material and an object of cooling, whereby heat from the object of cooling is transmitted to the working material when the working material absorbs the heat, and whereby heat from the working material is prevented from being transmitted to the object of cooling when the working material radiates heat, and heat absorbing means for absorbing the heat evolved from the working material.

In the magnetic refrigerator thus constructed, movement of the members will never produce any such unwanted heat as frictional heat, so that heat loss is eliminated, thus providing higher thermal efficiency.

The heat absorbing means is perferably formed of one or more directional heat pipes.

The selective application of the magnetic field to the working material is preferably achieved by reciprocating a continuously excited electromagnetic coil or by means of an intermittently excited electromagnetic coil.

BRIEF DESCRIPTION OF THE DRAWINGS

FIGS. 2 to 4 show a magnetic refrigerator according to an embodiment of this invention, in which FIG. 2 is a sectional view of the refrigerator, FIG. 3 is a sectional view of a direction heat pipe used in the refrigerator, and FIG. 4 is a schematic view of a coil drive mechanism;

DETAILED DESCRIPTION OF THE PREFERRED EMBODIMENTS

There will now be described in detail a magnetic refrigerator according to an embodiment of this invention with reference to the accompanying drawings.

Figure 2:
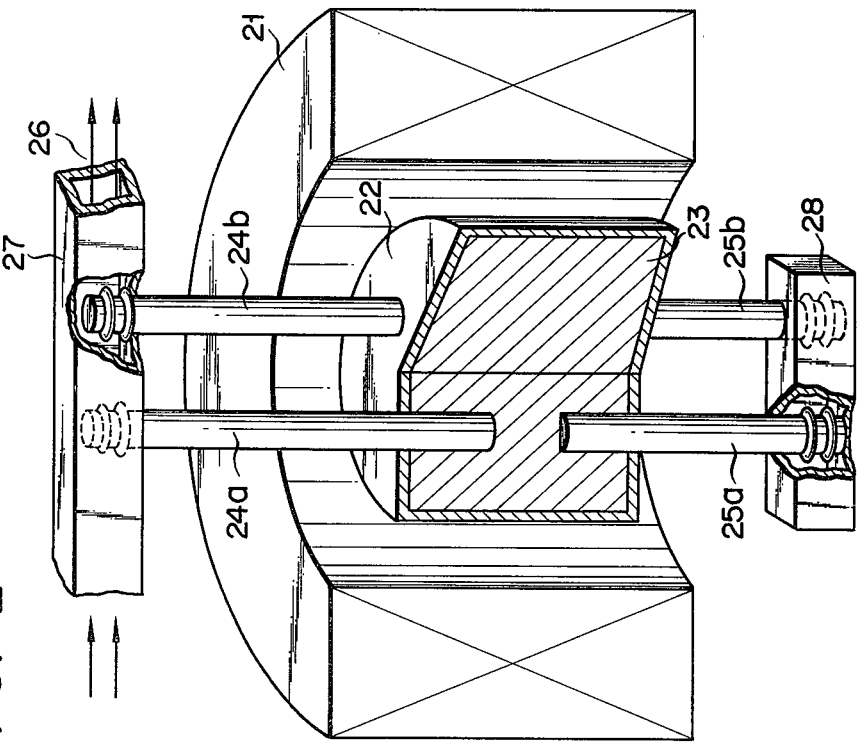

In FIG. 2, numeral 21 designates a cylindrical superconductive coil which can be moved up and down with its axis vertical. A cylindrical container 22 is coaxially fixed in the center of the cylindrical coil 21 by suitable means. The container 22 may be formed from an adiabatic material, or be held in liquid helium or a vacuum so that the inside and outside of the container 22 are thermally isolated. The container 22 is filled with a working material 23 such as gadolinium-gallium-garnet. A pair of directional heat pipes 24a and 24b are fixed to the top wall of the container 22, and another pair of heat pipes 25a and 25b are fixed to the bottom wall, both pairs extending vertically. The lower portions of the upper heat pipes 24a and 24b penetrate the top wall of the container 22 to be embedded in the working material 23, while their lower portions project into a heat discharging medium pipe 27 through which a heat discharging medium 26, such as gas, flows. The upper portions of the lower heat pipes 25a and 25b penetrate the bottom wall of the container 22 to be embedded in the working material 23, while their lower portions extend into an object 28 of cooling, e.g., helium, sensor, etc. If the object of cooling is helium, then it is contained in a receptacle which preferably has inlet and outlet ports. After the helium in the receptacle is cooled to a predetermined temperature, it is taken out through the outlet port, and another portion of helium is supplied through the inlet port.

Each of the directional heat pipes includes a cylindrical sealed pipe 31 closed at both ends. An intermediate portion 31a of the peripheral wall of the pipe 31 is formed of a material with relatively low thermal conductivity, e.g., stainless steel, while upper and lower portions 31b and 31c of the peripheral wall are made of a material with high thermal conductivity, e.g., copper. Fins 33 and 34 of the same material as the upper and lower portions 31b and 31c protrude from the outer peripheral surface of the pipe 31 near the respective ends of the upper and lower portions 31b and 31c. A given amount of working fluid 32 with a low boiling point, such as liquid helium, is sealed in the pipe 31.

There will now be described the operation of the directional heat pipes of the aforementioned construction.

Figure 3:
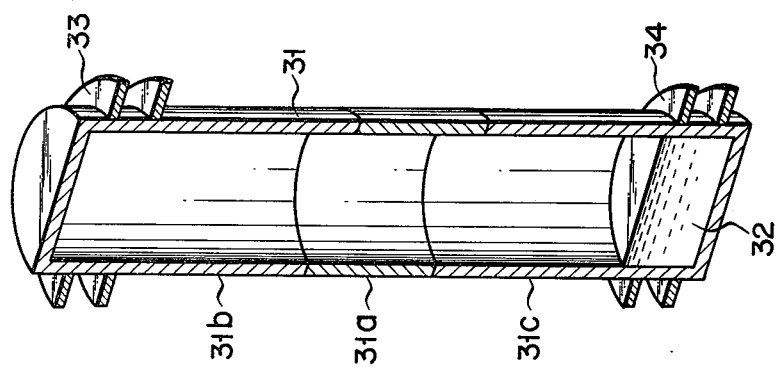

As shown in FIG. 3, the pipe 31 is positioned vertically. When thermal input is absorbed through the fins 34 at the lower portion 31c, the working fluid 32 is heated and evaporated to rise in the pipe 31. The heat of the heated working gas is radiated through the fins 33 at the upper portion 31b. Namely, heat absorbed from the outside through the lower fins 33 is radiated through the upper fins 33. After radiating heat at the upper portion 31b, the working gas condenses to be liquefied, and then drops and returns to the lower portion 31c. Thus, the heat pipe has a function only to transmit heat upward. Accordingly, even though the upper fins 33 and their vicinities are heated, the heat will never be transmitted to the lower part of the pipe 31. If the whole pipe 31 is formed from a good heat conductor, the heat may be transmitted downward by heat conduction through the peripheral wall of the pipe 31. In this embodiment, therefore, the intermediate portion 31a of the pipe 31 is formed from a material with low thermal conductivity so that heat conduction is cut off at the intermediate portion 31a.

Figure 1:
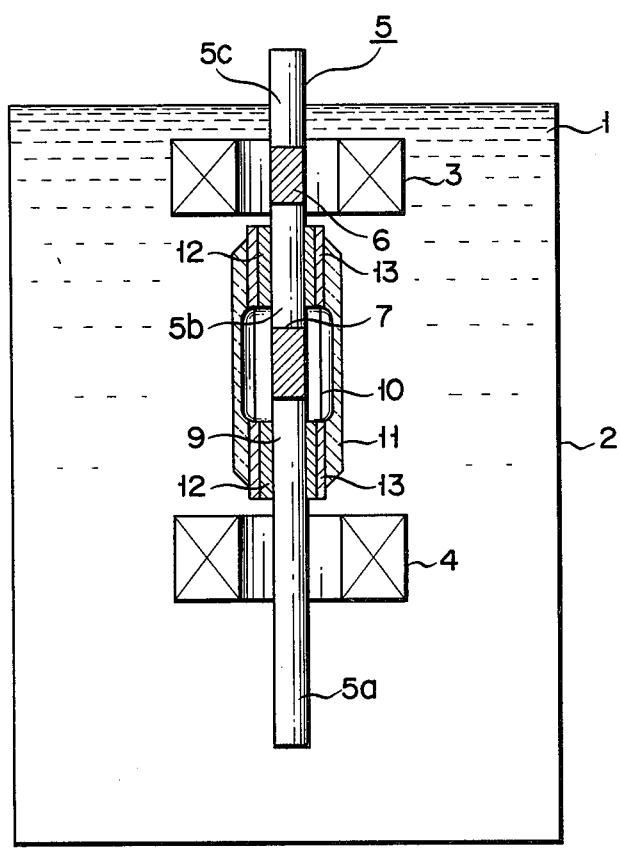
FIG. 1 is a schematic view of a prior art magnetic refrigerator.
Figure 4:
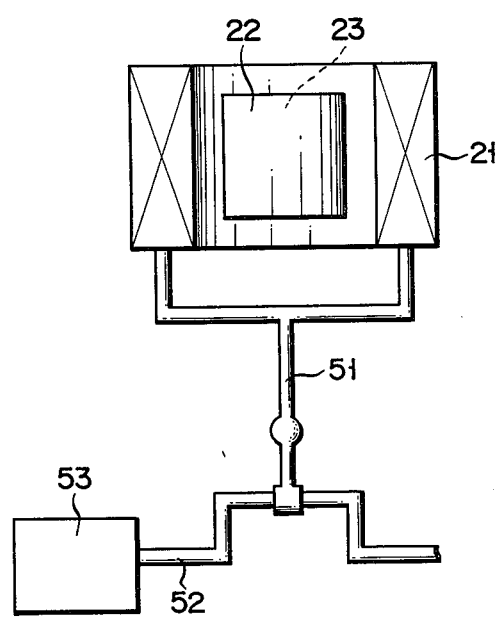

FIG. 4 shows means for intermittently forming a magnetic field in the working material 23. This means includes a shaft 51 with a universal joint at the intermediate portion, one end of which is connected to the superconductive coil 21, a crank shaft 52 supporting the other end of the shaft 51, and a motor 53 for rotating the crank shaft 52. When the motor 53 is driven, the shaft 51 is reciprocated vertically by the crank shaft 52, so that the superconductive coil 21 is also reciprocated vertically. When the coil 21 is in its upper position as shown in FIG. 1, the working material 23 is located inside the coil 21 and therefore in a magnetic field produced by the coil 21. If the coil 21 is moved downward, then the working material 23 is located above the coil 21, and ceases to be affected by the magnetic field of the coil 21. For the intermittent application of the magnetic field to the working material, the aforementioned means may be replaced with, e.g., means for intermittently supplying electric current to the superconductive coil.

The operation of the magnetic refrigerator thus constructed will now be described.

When the excited superconductive coil 21 is moved to the upper position so that the working material 23 is located in the magnetic field, the working material 23 radiates heat. The radiated heat is led through the upper directional heat pipes 24a and 24b into the heat discharging medium pipe 27, and is discharged through the heat discharging medium 26 (helium at 4.2° K.). In this case, the heat radiated from the working material 23 is never transmitted through the lower directional heat pipes 25a and 25b to the object 28 of cooling. Subsequently, when the magnetic field is removed from the working material 23 by moving the coil, the working material 23 absorbs heat from the object 28 (helium at 4.2° K.) through the lower directional heat pipes 25a and 25b, thereby cooling the object 28. At this time, the upper directional heat pipes 24a and 24b do not operate. When the heat from the object of cooling 28 is absorbed to such a degree that the temperatures of the object 28 and the working material 23 are substantially equal, the working material 23 is subjected again to the magnetic field. As a result, the heat accumulated in the working material 23 is radiated, and discharged through the upper directional heat pipes 24a and 24b into the heat discharging medium 26. As these operations are repeated, the object of cooling 28 is cooled to a given temperature, e.g., 1.8° K.

In the above embodiment, the heat from the working material is discharged also through the directional heat pipes. Alternatively, however, the heat may be discharged directly from the working material, as shown in FIG. 5.

Figure 5:
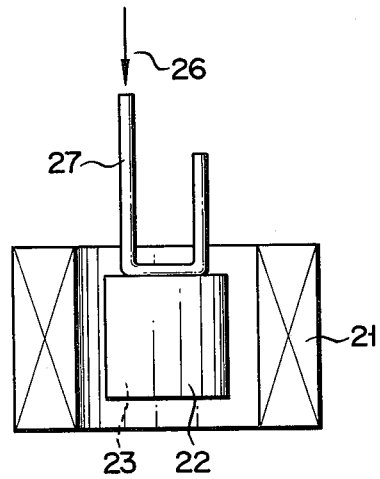
FIG. 5 is a schematic view of a magnetic refrigerator according to another embodiment of the invention.

In the embodiment shown in FIG. 5, the heat discharging medium pipe 27 is connected to the container 22 so that cooling helium gas (heat discharging medium 26) at 20° K. flowing through the pipe 27 may be blown directly against the working material 23 in the container 22. The pulse superconductive coil 21 is used as the means for intermittently forming the magnetic field. In this case, the heat discharge is achieved by blowing the helium gas at 20° K. against the working material 23 during the time interval which elapses from the instant that the magnetic field is formed until the magnetic field is removed.

In the magnetic refrigerator of the construction described above, the object of cooling is cooled without the use of a mechanism to radiate heat during operation, such as a piston-cylinder mechanism. Thus, heat loss is reduced for higher thermal efficiency.

Figure 6:
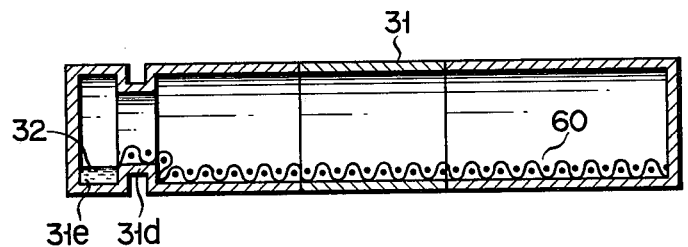
FIGS. 6 and 7 are sectional views showing modifications of the directional heat pipe.
Figure 7:
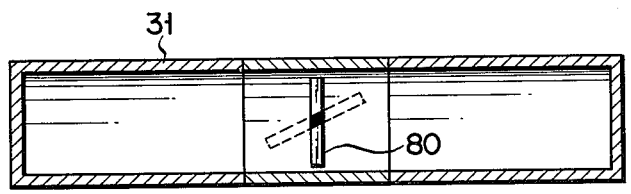

Referring now to FIGS. 6 and 7, modifications of the directional heat pipes will be described.

Unlike the one used in the foregoing embodiments, these modified directional heat pipes are so designed as to be arranged horizontally instead of being positioned vertically.

In the directional heat pipe shown in FIG. 6, an annular projection 31d is formed on the inner peripheral surface of the pipe 31 near one end (left-hand side of FIG. 6) thereof, and a working liquid reservoir portion 31e is defined between the projection 31d and the inside of the one end face of the pipe 31. A capillary member 60 formed of, e.g., a net, is spread over the entire bottom surface of the pipe 31 except for the reservoir portion 31e. In this construction, when the one end side is heated, the working liquid 32 in the reservoir portion 31e is evaporated and flows to the other end side (to the right of FIG. 6), where heat is removed from the gas.

As a result, the fluid condenses and drops onto the capillary member 60. The liquid helium caught by the capillary member 60 moves toward the one end side by capillarity, and returns to the reservoir portion 31e. Thus, the heat is gradually transmitted from one end side of the pipe 31 to the other. It is to be understood that heat will not be transferred from the other end side to the one end side even if the temperature of former is higher than that of the latter.

The heat pipe shown in FIG. 7 has a valve mechanism 80 substantially half way between both ends of the pipe 31. The valve mechanism 80 controls the flow of helium gas between both end sides of the pipe 31. The switching operation of the valve mechanism 80 is preferably controlled in synchronism with the transfer of the superconductive coil 21.

What we claim is:

1. A magnetic refrigerator for cooling an object of cooling, comprising:
    a working material radiating heat when a magnetic field is applied thereto and absorbing heat when the magnetic field is removed therefrom;
    magnetic field generating means for selectively applying or removing the magnetic field to or from the working material;
    at least one directional heat pipe disposed between the working material and the object of cooling, whereby heat from the object of cooling is transmitted to the working material when the working material absorbs the heat, and whereby heat from the working material is prevented from being transmitted to the object of cooling when the working material radiates the heat; and
    heat absorbing means for absorbing the heat radiated from the working material,
    wherein said directional heat pipe includes a sealed pipe positioned vertically and having a lower portion connected to the object of cooling and an upper portion connected to the working material, and a working fluid sealed in the sealed pipe and evaporating at a given temperature to transmit heat upward.

2. The magnetic refrigerator according to claim 1, wherein said magnetic field generating means includes an electromagnetic coil movable between a first position where the magnetic field is applied to the working material and a second position where the magnetic field is removed from the working material, and a drive mechanism for moving the electromagnetic coil between the first and second positions.

3. The magnetic refrigerator according to claim 1, wherein said magnetic field generating means includes a pulse electromagnetic coil.

4. The magnetic refrigerator according to claim 1, wherein said sealed pipe has an intermediate portion located between the upper and lower portions and lower in thermal conductivity than the same.

5. The magnetic refrigerator according to claim 1, wherein said heat absorbing means includes a heat discharging medium pipe through which a heat discharging medium flow, and at least one directional heat pipe disposed between the heat discharging medium pipe and the working material to transmit heat from the working material to the heat discharging medium.

6. A magnetic refrigerator for cooling an object of cooling, comprising:
    a working material radiating heat when a magnetic field is applied thereto and absorbing heat when the magnetic field is removed therefrom;
    magnetic field generating means for selectively applying or removing the magnetic field to or from the working material;
    at least one directional heat pipe disposed between the working material and the object of cooling, whereby heat from the object of cooling is transmitted to the working material when the working material absorbs the heat and whereby heat from the working material is prevented from being transmitted to the object of cooling when the working material radiates the heat; and
    heat absorbing means for absorbing the heat radiated from the working material,
    wherein said directional heat pipe includes a sealed pipe positioned horizontally and adjoining the object of cooling at one end side and the working material at the other end side, a working fluid sealed in the sealed pipe, and means allowing the working fluid to flow from the one end side to the other end side when the working fluid is vaporized and allowing the working fluid to flow from the other end side to the one end side when the working fluid is liquefied.

7. The magnetic refrigerator according to claim 6, wherein said magentic field generating means includes an electromagnetic coil movable between a first position where the magnetic field is applied to the working material and a second position where the magnetic field is removed from the working material, and a drive mechanism for moving the electromagnetic coil between the first and second positions.

8. The magnetic refrigerator according to claim 6, wherein said magnetic field generating means includes a pulse electromagnetic coil.

9. The magnetic refrigerator according to claim 6, wherein said heat absorbing means includes a heat discharging medium pipe through which a heat discharging medium flow, and at least one directional heat pipe disposed between the heat discharging medium pipe and the working material to transmit heat from the working material to the heat discharging medium.

* * * * *